Sept. 20, 1955 R. O. GRAY 2,718,551

FREQUENCY-COMPENSATED VIDEO AMPLIFIER OUTPUT CIRCUIT
WITH CONSTANT SYNCHRONIZING SIGNAL OUTPUT

Filed March 28, 1950

RICHARD O. GRAY
*INVENTOR.*

BY Francis W. Crotty

HIS ATTORNEY

United States Patent Office 2,718,551

Patented Sept. 20, 1955

2,718,551

FREQUENCY-COMPENSATED VIDEO AMPLIFIER OUTPUT CIRCUIT WITH CONSTANT SYNCHRONIZING SIGNAL OUTPUT

Richard O. Gray, Broadview, Ill., assignor to Zenith Radio Corporation, a corporation of Illinois Application March 28, 1950, Serial No. 152,349

2 Claims. (Cl. 178—7.5)

Figures 1, 2, 3:
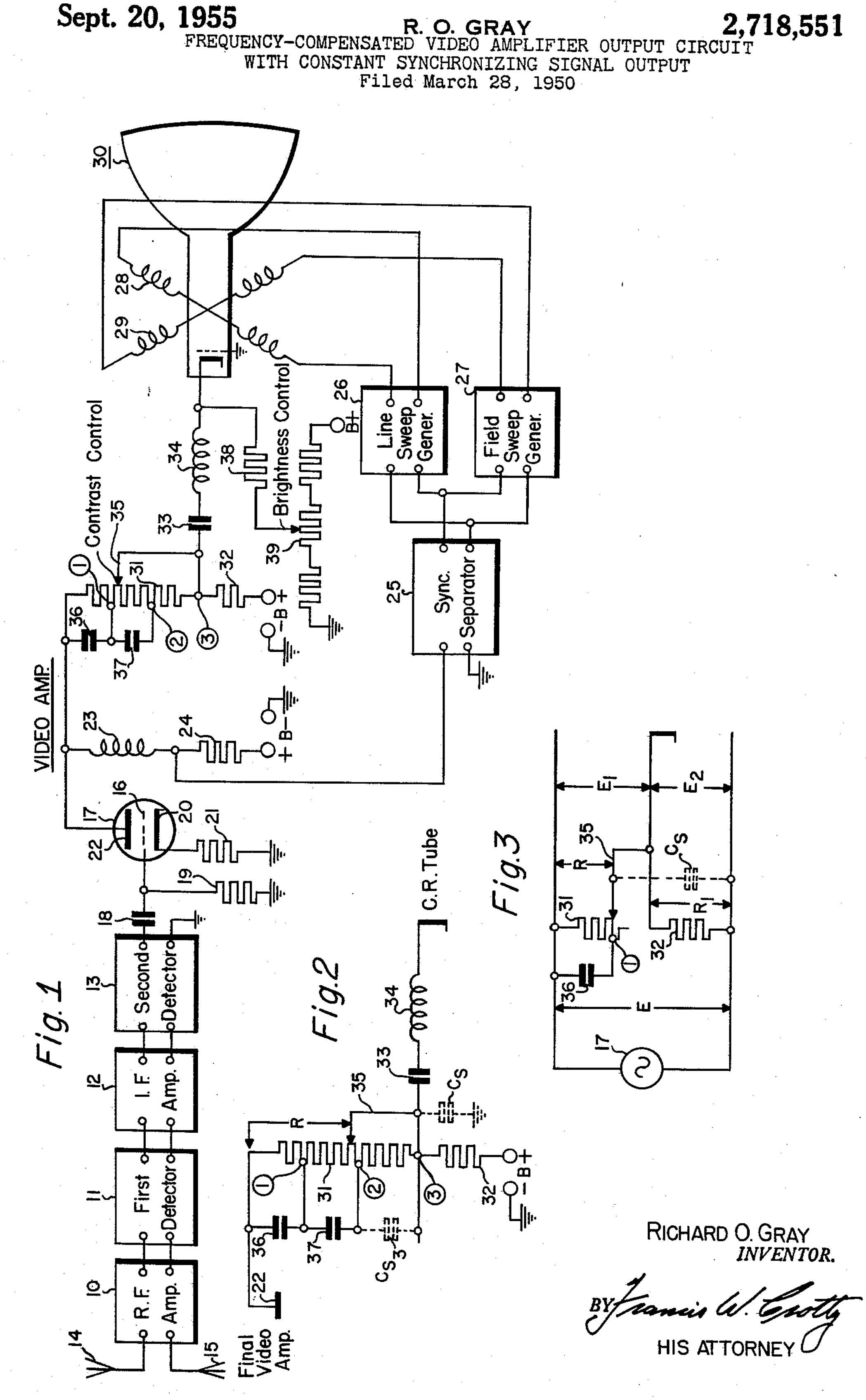

This invention relates to television receivers and more particularly to an improved contrast-control circuit for use in such receivers.

It is usual in television receivers to provide some means for controlling the amplitude of the video signal prior to its application to the image-reproducing tube. This control is desirable so that the contrast of the reproduced image may be adjusted at will.

Control of the amplitude of the video signal is accomplished in most television receivers by adjustment of the gain of one of the video amplifier stages. A disadvantage of such an arrangement is that it has been generally considered necessary to apply the video signal to the synchronizing chain of the receiver at some point prior to the video amplifier whose gain is adjusted by the contrast control. This operating requirement is based on the thought that otherwise the contrast control affects the amplitude of the signal applied to the synchronizing chain in addition to the amplitude of the signal delivered to the image-reproducing device and, consequently, when a condition of low contrast is established the amplitude of the signal supplied to the synchronizing system may become insufficient to maintain synchronization. Conversely, when a condition of high contrast prevails, the resultant high amplitude of the signal applied to the synchronizing system may render various stages in the synchronizing chain unstable.

Accordingly, in many present-day television receivers the video signal for application to the synchronizing chain is derived from the output circuit of one video amplifier stage, and a gain-control adjustment is provided in a succeeding video amplifier stage for contrast purposes. This arrangement is at best a compromise for it is desirable that the signal applied to the synchronizing chain have all the available amplification imparted thereto of which the receiver is capable so that satisfactory synchronization may be maintained under varying conditions of operation.

It is, therefore, highly desirable that a signal be applied to the synchronizing chain of the television receiver from the output circuit of the final video amplifier. To render this feasible, it is necessary that a contrast-control circuit be devised that controls the amplitude of the video signal as applied to the receiver image-reproducing device, and yet has no adverse effect on the amplitude of the signal applied to the synchronizing chain. It is apparent that if the contrast control is to have little or no effect on the signal delivered to the synchronizing chain, it must be connected in the output circuit of the final video amplifier, between the amplifier and an input electrode of the image-reproducing tube. Such contrast controls have been proposed in the past but have proved unsatisfactory since they are incapable of adjustment through an adequate contrast range without materially affecting the frequency response characteristics of the network coupling the video amplifier to the reproducing tube.

It is an object of this invention, therefore, to provide a contrast-control network for a television receiver which substantially avoids one or more of the recited limitations of prior arrangements.

It is another object of this invention to provide an improved contrast-control circuit which permits of maximum amplification for the signal to be applied to the synchronizing chain of the receiver, and which has no adverse effect on the amplitude of that signal.

A further object of this invention is to provide an improved contrast-control circuit which may be incorporated in a network coupling the final video amplifier of a television receiver to the image-reproducing device while maintaining a substantially uniform frequency response characteristic for the coupling network over a desired video-frequency range, and which may be adjusted through a selected contrast range without materially affecting this response characteristic.

The features of this invention which are believed to be new are set forth with particularity in the appended claims. The invention itself, however, together with further objects and advantages thereof may best be understood by reference to the following description when taken in conjunction with the accompanying drawing, in which:

Figure 1 shows a television receiver incorporating the contrast-control circuit of the present invention, and Figures 2 and 3 show diagrams useful in the understanding of the invention.

Referring now to Figure 1, the television receiver illustrated therein includes a radio-frequency amplifier 10 of one or more stages, a first detector 11, an intermediate-frequency amplifier 12 of any desired number of stages, and a second detector 13. These components may be of any well-known construction and are cascade-connected in the usual fashion. The input terminals of radio-frequency amplifier 10 may be connected to any suitable antenna circuit 14, 15.

One of the output terminals of second detector 13 is connected to ground, and the other is coupled to the control electrode 16 of an electron-discharge device 17 through a coupling capacitor 18, the control electrode being connected to ground through a grid-leak resistor 19. The device 17 will be considered to be the final video amplifier of the receiver, and it may be preceded by as many stages of video amplification as desired. These additional stages have been omitted from the drawing for purposes of simplicity. The cathode 20 of device 17 is connected to ground through a cathode biasing resistor 21, and the anode 22 is connected to the positive terminal B+ of a source of unidirectional potential through a shunt peaking coil 23 series-connected with a load resistor 24, the negative terminal of this source being connected to ground. The junction of coil 23 and resistor 24 is connected to a synchronizing-signal separator 25 of usual construction and the output terminals of this stage are connected to a line-sweep generator 26 and a field-sweep generator 27 also of well-known construction. The sweep generators 26 and 27 are connected, respectively, to the line- and field-deflecting elements 28 and 29 of an image-reproducing device 30.

The anode 22 of device 17 is further connected to the positive terminal B+ of a unidirectional potential source through series-connected resistors 31 and 32, the negative terminal of this source being grounded. The junction of resistors 31, 32 is connected to one of the input electrodes of device 30 through a series-connected coupling capacitor 33 and a peaking coil 34. The effective value of resistor 31 may be varied by a movable tap or contrast control 35 and adjustment of this control adjusts the contrast of the image reproduced by device 30 in a manner to be described. Portions of the resistor 31 are shunted by compensating capacitors 36 and 37 for reasons also to be described. The resistor 32 is included in the circuit so that even when the control 35 is at a minimum resistance position on resistor 31, this does not give rise to a low-resistance shunting path across the network 23, 24. However, resistor 32 may be given an appropriate value so that all adjustments of the contrast control 35 have no material effect on the synchronizing signal developed across the resistor 24, the value of this resistor in a constructed embodiment of the invention being listed hereinafter. The input electrode of device 30 is also connected to a brightness control network of well-known construction and comprising a resistor 38 which is connected to the movable tap of a potentiometer 39 which, in turn, is connected between the positive terminal B+ of a unidirectional potential source and ground.

A television signal intercepted by antenna circuit 14, 15 is amplified by radio-frequency amplifier 10, and heterodyned to the selected intermediate-frequency of the receiver in first detector 11. The resulting intermediate-frequency signal is amplified in intermediate-frequency amplifier 12 and detected in second detector 13. The composite video signal derived from second detector 13 may be amplified in one or more video amplifier stages (not shown) and applied to the final video amplifier 17 wherein it is further amplified. The amplified video signal is applied to synchronizing-signal separator 25 by way of network 23, 24. The synchronizing components of the television signal are separated in separator 25 and applied to line-sweep generator 26 and field-sweep generator 27 to control the operation of these generators. The line- and field-sweep signals derived from generators 26 and 27 are supplied to deflection elements 28 and 29 of reproducing device 30 and control the scansion of the cathode-ray beam therein in well-known manner. It is to be noted that the video signal is applied to the synchronizing chain of the receiver from the output circuit of the final video amplifier and not from a preceding video amplifier as is usually the case in receivers wherein contrast is controlled by adjusting the gain of a video amplifier.

The video signal from amplifier 17 is applied to the input electrode of reproducing device 30 through a network that includes the contrast control circuit of the present invention. The amplitude of the video signal as applied to this input electrode, and hence the contrast of the image reproduced by device 30, may be varied by adjusting movable control 35. In accordance with the invention, and in a manner to be described, the network is constructed to have a substantially uniform response characteristic to signals throughout the frequency range of the components of the video signal, and adjustment of contrast control 35 controls the contrast through a preselected contrast range but has no appreciable effect on this uniform response characteristic. The brightness of the reproduced image may be adjusted by means of the well-known brightness control. In this manner, the video components of the received television signal are used to control the intensity of the cathode-ray beam in device 30, and the synchronizing components are used to synchronize the scansion of this beam. The device 30, therefore, reproduces the picture intelligence represented by the television signal with a contrast determined by the position of movable control 35 along resistor 31, and with a brightness determined by the adjustment of brightness control 39.

A fragmentary diagram of the contrast-control circuit of the present invention is shown in Figure 2. The first compensating capacitor 36, having a value $C_1$, is connected between the upper extremity and a tap 1 of resistor 31 while the second compensating capacitor 37, having a value $C_2$ is bridged between the tap 1 and a further tap 2 of this resistor. A bridging capacitance also exists between tap 2 and lower extremity 3 of resistor 31 and is formed of the stray capacitance $C_{s3}$ of the circuit. The resistor 32 has a value $R_1$ and is shunted by a capacitance $C_s$ formed of the stray capacitance of the input circuit of reproducing device 30. The portion of resistor 31 from its upper extremity to any selected position of contrast control 35 is assumed to have a value R.

As a first approximation the values of the various elements are so chosen that the following relations are realized:

With contrast control 35 on tap 1:

$$R\,C_1=R_1C_s \qquad (1)$$

With contrast control 35 on tap 2:

$$R\cdot\frac{1}{\frac{1}{C_1}+\frac{1}{C_2}}=R_1C_s \qquad (2)$$

With contrast control 35 on tap 3:

$$R\cdot\frac{1}{\frac{1}{C_1}+\frac{1}{C_2}+\frac{1}{C_{s3}}}=R_1C_s \qquad (3)$$

From these equations the values of the various elements of the circuit may be determined. By the use of such values, a generally satisfactory network may be constructed, although it may be desirable under certain circumstances to alter these derived values to realize more completely a particular frequency response of the network coupling the final video amplifier to the input electrode of reproducing device 30 over the video frequency range of a received signal, regardless of the setting of the contrast control.

In one constructed embodiment of the invention found to have practical utility the following values were employed for the various elements. These values are listed herein merely by way of example:

| | |
|---|---|
| Capacitor **36** | 20 micro micro farads. |
| Capacitor **37** | 20 micro micro farads. |

Effective value of resistor 31:

| | |
|---|---|
| With contrast control **35** on tap **1**. | 18,000 ohms. |
| With contrast control **35** on tap **2**. | 36,000 ohms. |
| With contrast control **35** on tap **3**. | 150,000 ohms. |
| Resistor **32** | 27,000 ohms. |
| Resistor **24** | 9,100 ohms. |
| Capacitor **33** | 0.047 micro farad. |
| Peaking coil **34** | 278 micro henries. |
| Peaking coil **23** | 850 micro henries. |
| B+ | 360 volts. |

Figure 3 shows an approximately equivalent diagram of the network coupling final video amplifier 17 to the input electrode of reproducing device 30. Assume that device 17 generates a potential E, that the contrast control 35 is positioned at tap 1 and defines a portion of resistor 31 of value R, and that the compensating capacitor 36 is not connected into the circuit. The resistor 32 shunted by the capacitance $C_s$, and the effective portion of resistor 31, form a potentiometer across the source 17. The potential applied to the cathode of device 30 is as follows:

$$E_2=\frac{E_1}{R}\cdot\frac{1}{\sqrt{\frac{1}{X_{c_s}^2}+\frac{1}{R_1^2}}} \qquad (4)$$

Where $X_{c_s}$ is the reactance of capacitance $C_s$, and $E_1$ is the potential developed across the aforementioned portion of resistor 31.

It is highly desirable for uniform response that the potential $E_2$ remain substantially constant throughout the video-frequency range of the received signal. However, the value of capacitance $C_s$ is usually such that for the high-frequency video components the reactance $_{c_s}$ tends to zero and the potential $E_2$ applied to the cathode of device 30, also tends to zero.

Now assume that the compensating capacitor 36 is connected to the tap (1) of resistor 31 so that it shunts the portion of this resistor having the value R. And assume that its value $C_1$ is chosen in accordance with Equation 1 so that:

$$RC_1=R_1C_s \qquad (5)$$

That is:

$$\frac{R}{X_{c_1}}=\frac{R_1}{X_{c_s}} \qquad (6)$$

$X_1$ is the reactance value of capacitor 36. The value of the potential applied to the cathode of device 30 now becomes:

$$E_2=E_1\frac{\sqrt{\frac{1}{X_{c_1}^2}+\frac{1}{R^2}}}{\sqrt{\frac{1}{X_{c_s}^2}+\frac{1}{R_1^2}}} \qquad (7)$$

$$=E_1\frac{\sqrt{X_{c_1}^2+R^2}}{\sqrt{X_{c_s}^2+R_1^2}}\cdot\frac{X_{c_s}R_1}{X_{c_1}R} \qquad (8)$$

Applying Equation 6:

$$E_2=\frac{\frac{R}{R_1}\sqrt{R_1^2+X_{c_s}^2}}{\sqrt{R_1^2+X_{c_s}^2}}\cdot\frac{R_1^2}{R^2} \qquad (9)$$

$$=E_1\cdot\frac{R_1}{R} \qquad (10)$$

Therefore, with the compensating capacitor 36 connected to tap 1, and the contrast control 35 similarly positioned at this tap, the effect of capacitance $C_s$ is compensated and the potential $E_2$ applied to the cathode of reproducing device 30 is independent of frequency. In this manner a uniform frequency response is obtained when the contrast control is positioned on tap (1). It is apparent that the ideal network would consist of an infinite number of such compensating capacitors, each connected to taps on the resistor 31 corresponding respectively to all the various positions of the contrast control 35, and each having a value derived from Equation 1.

It has been found that a sufficiently close approximation can be obtained by using the two compensating capacitors 36 and 37 of Figure 1, these capacitors having the values of the order set forth in Expressions 1 and 2 supra. With two such compensating capacitors, it has been found that a satisfactorily uniform response can be obtained over the video-frequency band for all settings of the contrast control 35. However, the invention is obviously not limited to the use of two compensating capacitors, since the number of such capacitors may be increased to any limit depending upon the degree of uniformity desired in the frequency response of the coupling network for all settings of the contrast control.

This invention provides, therefore, an improved output network for the final video amplifier of a television receiver and which comprises a circuit including a contrast control for applying the amplified composite video signal to the reproducing tube, and a further circuit for applying the composite signal to the synchronizing channel of the receiver. The improved network of the invention is so constructed that a substantially uniform frequency response is obtained throughout the frequency range of the video signal for various settings of the contrast control and, moreover, these settings have no material effect on the amplitude of the video signal as applied to the synchronizing channel.

While a particular embodiment of the invention has been shown and described modifications may be made and it is intended in the appended claims to cover all such modifications as fall within the true spirit and scope of the invention.

I claim:

1. In a television receiver, a video amplifier including an electron-discharge device having an anode, an image-reproducing device having an input electrode, a synchronizing channel, and a network coupling said video amplifier to said reproducing device and to said synchronizing channel, said network comprising: a first resistive element having one terminal connected to said anode and including a movable contact connected to one terminal thereof; a second resistive element series-connecting said movable contact to a point of reference potential; a third resistive element connecting said anode to said point of reference potential in shunt with said first and second resistive elements; a connection from said third resistive element to said synchronizing channel; a circuit coupling the junction of said movable contact and said second resistive element to said input electrode of said reproducing device and establishing a capacitive reactance in shunt with said second resistive element; and a plurality of compensating capacitors connected between said one terminal of said first resistive element and respective taps thereon and individually having a value in accordance with the relation $C=R_1C_s/R$ where $R_1$ is the value of said second resistive element, $S_s$ is the value of said capacitive reactance, R is the value of the said first resistive element between said one terminal and the corresponding one of said taps, and C is the value of capacitance bridged between said one terminal and said corresponding tap.

2. In a television receiver, a video amplifier including an electron-discharge device having an anode, an image-reproducing device having an input electrode, a synchronizing channel, and a network coupling said video amplifier to said reproducing device and to said synchronizing channel, said network comprising: a first resistive element having one terminal connected to said anode and including a movable contact connected to one terminal thereof; a second resistive element series-connecting said movable contact to a point of reference potential; a series-connected peaking coil and load resistor connecting said anode to said point of reference potential in shunt with said first and second resistive elements; a connection extending from the junction of said peaking coil and said load resistor to said synchronizing channel; a circuit coupling the junction of said movable contact and said second resistive element to said input electrode of said reproducing device and establishing a capacitive reactance in shunt with said second resistive element; and a pair of series-connected compensating capacitors connected between said one terminal of said first resistive element and one tap on said first resistive element and having their junction connected to a second tap on said first resistive element intermediate said one terminal and said one tap, said taps defining preselected portions of said first resistive element shunted respectively by said compensating capacitors; and each of said compensating capacitors having a value in accordance with the relation $C=R_1C_s/R$ where $R_1$ is the value of said second resistive element, $C_s$ is the value of said capacitive reactance, R is the value of said first resistive element between said one terminal and a particular one of said taps, and C is the value of capacitance bridged between said one terminal and said particular tap.

References Cited in the file of this patent

UNITED STATES PATENTS

| | | |
|---|---|---|
| 2,495,511 | Dolberg | Jan. 24, 1950 |
| 2,514,112 | Wright et al. | July 4, 1950 |
| 2,522,967 | Shaw | Sept. 19, 1950 |
| 2,584,332 | Crooker et al. | Feb. 5, 1952 |
| 2,632,049 | Druz | Mar. 17, 1953 |

FOREIGN PATENTS

| | | |
|---|---|---|
| 246,035 | Switzerland | Aug. 16, 1947 |
| 444,177 | Great Britain | Mar. 16, 1936 |
| 505,899 | Great Britain | May 15, 1939 |

OTHER REFERENCES

Rider's Television Manual, vol. 4, Motorola TV, p. 4–22, chassis TS–14 A, circuit diagram dated Oct. 27, 1949.